United States Patent
Fuller et al.

(10) Patent No.: US 9,714,780 B2
(45) Date of Patent: Jul. 25, 2017

(54) ON-DEMAND MICRO EXPANSION VALVE FOR A REFRIGERATION SYSTEM

(71) Applicant: Zhejiang DunAn Hetian Metal Co., Ltd., Zhuji, Zhejiang (CN)

(72) Inventors: Edward Nelson Fuller, Manchester, MI (US); Parthiban Arunasalam, Austin, TX (US)

(73) Assignee: ZHEJIANG DUNAN HETIAN METAL CO., LTD., Zhuji, Zhejiang (CN)

(*) Notice: Subject to any disclaimer, the term of this patent is extended or adjusted under 35 U.S.C. 154(b) by 211 days.

(21) Appl. No.: 14/655,517

(22) PCT Filed: Jun. 24, 2014

(86) PCT No.: PCT/US2014/043848
§ 371 (c)(1),
(2) Date: Jun. 25, 2015

(87) PCT Pub. No.: WO2014/209988
PCT Pub. Date: Dec. 31, 2014

(65) Prior Publication Data
US 2015/0354875 A1 Dec. 10, 2015

Related U.S. Application Data

(60) Provisional application No. 61/839,187, filed on Jun. 25, 2013.

(51) Int. Cl.
*F25B 41/04* (2006.01)
*F25B 13/00* (2006.01)
(Continued)

(52) U.S. Cl.
CPC ............ *F25B 41/04* (2013.01); *F25B 13/00* (2013.01); *F25B 41/062* (2013.01); *F25B 49/02* (2013.01);
(Continued)

(58) Field of Classification Search
CPC .. F25B 41/06; F25B 41/067; F25B 2341/062; F25B 2341/066; F25B 2341/0661; F25B 2341/0662
See application file for complete search history.

(56) References Cited

U.S. PATENT DOCUMENTS 3,977,205 A 8/1976 Dreisziger et al.
4,606,198 A 8/1986 Latshaw et al.
(Continued)

FOREIGN PATENT DOCUMENTS

CN 102644799 A 8/2012

OTHER PUBLICATIONS

First Chinese Office Action, Application No. 201480007342.4, dated Mar. 20, 2017.

*Primary Examiner* — Cassey D Bauer
(74) *Attorney, Agent, or Firm* — MacMillan, Sobanski & Todd, LLC

(57) ABSTRACT

A refrigeration system includes a compressor, a condenser fluidly connected to the compressor, an evaporator fluidly connected to the condenser and the compressor, such that fluid may flow from the compressor through the condenser, through the evaporator, and again through the compressor. An expansion device is fluidly connected between the condenser and the evaporator, and a micro-expansion valve is also connected between the condenser and the evaporator.

15 Claims, 6 Drawing Sheets

(51) Int. Cl.
*F25B 41/06* (2006.01)
*F25B 49/02* (2006.01)

(52) U.S. Cl.
CPC ... *F25B 2341/0661* (2013.01); *F25B 2400/15* (2013.01); *F25B 2600/2513* (2013.01); *F25B 2700/1933* (2013.01); *F25B 2700/21151* (2013.01)

(56) References Cited

U.S. PATENT DOCUMENTS

| | | |
|---|---|---|
| 6,523,560 B1 | 2/2003 | Williams et al. |
| 6,540,203 B1 | 4/2003 | Hunnicutt |
| 6,845,962 B1 | 1/2005 | Barron et al. |
| 7,156,365 B2 | 1/2007 | Fuller et al. |
| 8,011,388 B2 | 9/2011 | Fuller et al. |
| 8,113,482 B2 | 2/2012 | Hunnicutt |
| 9,140,613 B2 | 9/2015 | Arunasalam et al. |
| 2002/0139138 A1* | 10/2002 | Repice .............. F25B 41/06 62/525 |
| 2002/0170302 A1* | 11/2002 | Bagley .............. F25B 41/04 62/196.4 |
| 2006/0022160 A1 | 2/2006 | Fuller et al. |
| 2012/0140416 A1* | 6/2012 | Price .............. F28D 9/0093 361/701 |

\* cited by examiner

ON-DEMAND MICRO EXPANSION VALVE FOR A REFRIGERATION SYSTEM

CROSS-REFERENCE TO RELATED APPLICATIONS

This application claims the benefit of U.S. Provisional Application No. 61/839,187, filed Jun. 25, 2013, the disclosure of which is incorporated herein by reference.

BACKGROUND OF THE INVENTION

This invention relates in general to refrigeration systems. In particular, this invention relates to an improved refrigeration system that includes an expansion device having a microvalve.

MEMS (Micro Electro Mechanical Systems) are a class of systems that are physically small, having features with sizes in the micrometer range; i.e., about 10 µm or smaller. These systems have both electrical and mechanical components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today, there are many more micromachining techniques and materials available. The term "micromachined device" as used in this application means a device having some features with sizes of about 10 µm or smaller, and thus by definition is at least partially formed by micromachining. More particularly, the term "microvalve" as used in this application means a valve having features with sizes of about 10 µm or smaller, and thus by definition is at least partially formed by micromachining. The term "microvalve device" as used in this application means a micromachined device that includes a microvalve, and that may include other components. It should be noted that if components other than a microvalve are included in the microvalve device, these other components may be micromachined components or standard sized (larger) components. Similarly, a micromachined device may include both micromachined components and standard sized (larger) components.

Various microvalve devices have been proposed for controlling fluid flow within a fluid circuit. A typical microvalve device includes a displaceable member or valve component movably supported by a body for movement between a closed position and a fully open position. When placed in the closed position, the valve component substantially blocks or closes a first fluid port that is otherwise in fluid communication with a second fluid port, thereby preventing fluid from flowing between the fluid ports. When the valve component moves from the closed position to the fully open position, fluid is increasingly allowed to flow between the fluid ports.

U.S. Pat. Nos. 6,523,560; 6,540,203; and 6,845,962, the disclosures of which are incorporated herein by reference, describe microvalves made of multiple layers of material. The multiple layers are micromachined and bonded together to form a microvalve body and the various microvalve components contained therein, including an intermediate mechanical layer containing the movable parts of the microvalve. The movable parts are formed by removing material from an intermediate mechanical layer (by known micromachined device fabrication techniques, such as, but not limited to, Deep Reactive Ion Etching) to create a movable valve element that remains attached to the rest of the part by a spring-like member. Typically, the material is removed by creating a pattern of slots through the material to achieve the desired shape. The movable valve element will then be able to move in one or more directions an amount roughly equal to the slot width.

U.S. Pat. No. 7,156,365 the disclosure of which is also incorporated herein by reference, describes a method of controlling the actuator of a microvalve. In the disclosed method, a controller supplies an initial voltage to the actuator which is effective to actuate the microvalve. Then, the controller provides a pulsed voltage to the actuator which is effective to continue the actuation of the microvalve.

Refrigeration is frequently accomplished by continuously circulating, evaporating, and condensing a fixed supply of a refrigerant throughout a closed system. Evaporation occurs at a relatively low temperature and low pressure, while condensation occurs at a relatively high temperature and high pressure. Thus, refrigeration systems can function to transfer heat from an area of low temperature (such as, for example, an interior of a refrigerator) to an area of high temperature (such as, for example, a kitchen in which the refrigerator is located).

One common type of refrigeration system is often referred to as a fixed orifice refrigeration system. In a fixed orifice refrigeration system, refrigerant from the condenser is passed through an expansion device including an orifice having a fixed size. The size of this fixed orifice is usually selected in accordance with the anticipated normal operating conditions of the refrigeration system. One well known type of fixed orifice expansion device is a capillary tube, which is usually embodied as an elongated hollow cylindrical tube having a predetermined length and interior passageway having a predetermined size. Capillary tube types of expansion devices are desirable because they are very simple and inexpensive.

As mentioned above, known capillary tubes have an orifice that is fixed in size, and that size is typically determined in accordance with the anticipated normal operating conditions of the refrigeration system. However, when operated under certain transient conditions (such as where the cooling load demand on increased relatively rapidly), a fixed orifice type of refrigeration system may operate in a less than optimal manner. As a result, it may take an undesirably long amount of time for the fixed orifice type of refrigeration system to achieve a desired target refrigeration temperature. A few examples of transient conditions include when: (1) a new refrigerator installed and turned on the first time; (2) one or more warm products are placed in a refrigerator; (3) a refrigerator door is opened and closed during use; and (4) a refrigerator door is accidentally left open (or at least not fully closed) for an extended period of time. Thus, it would be desirable to provide an improved structure for a refrigeration system that is readily adaptable in response to one or more transient conditions so as to continuously operate in an optimal manner in spite of such transient conditions, yet remains relatively simple and inexpensive.

SUMMARY OF THE INVENTION

This invention relates to an improved structure for a refrigeration system that is readily adaptable in response to one or more transient conditions so as to continuously operate in an optimal manner in spite of such transient conditions, yet remains relatively simple and inexpensive.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
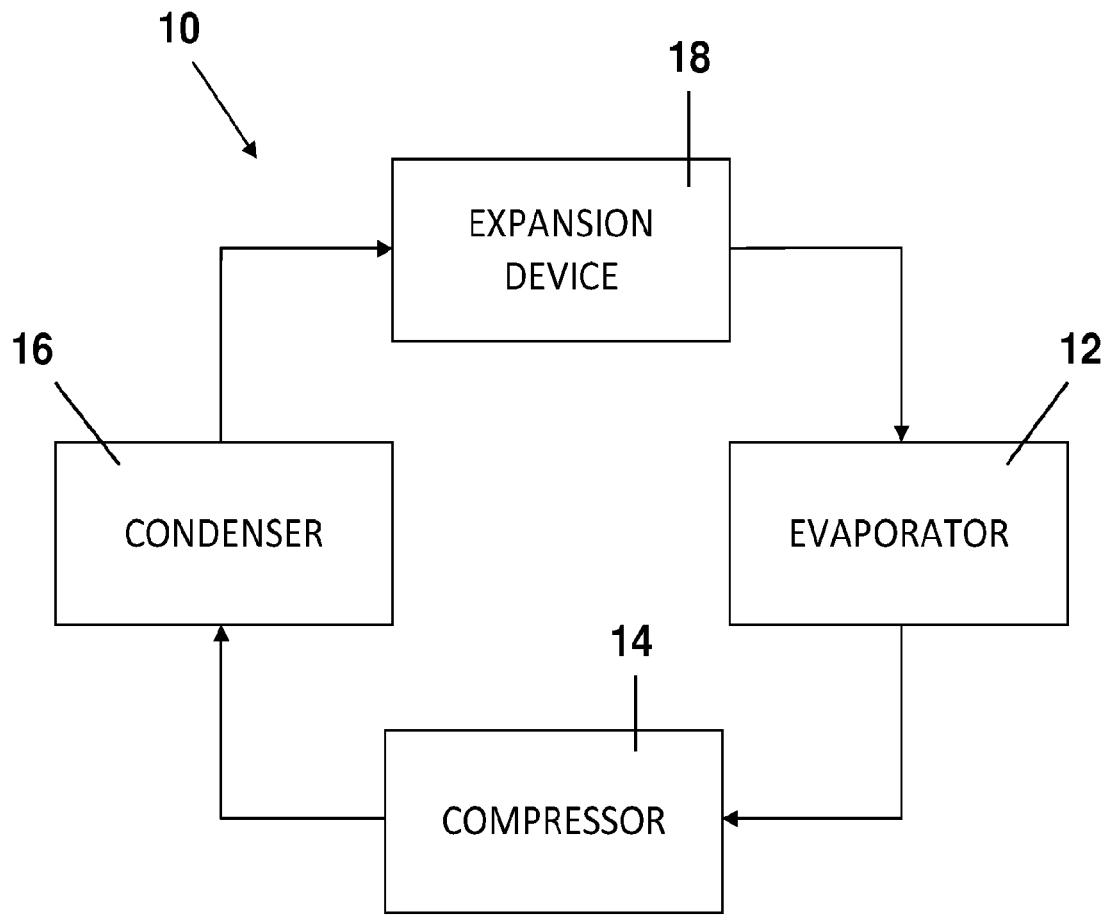
FIG. 1 is a block diagram of a conventional structure for a refrigeration system including a fixed orifice type of expansion device.

Referring now to the drawings, there is illustrated in FIG. 1 a block diagram of a conventional structure for a refrigeration system, indicated generally at 10. The conventional refrigeration system 10 includes an evaporator 12, such as an evaporator coil. The evaporator 12 may be conventional in the art and is configured to receive relatively low pressure liquid refrigerant at an inlet thereof. A relatively warm fluid, such as air, flows over the evaporator 12, causing the relatively low pressure liquid refrigerant flowing in the evaporator 12 to expand, absorb heat from the fluid flowing over the evaporator 12, and evaporate within the evaporator 12. The refrigerant is thus changed from a relatively low pressure liquid at the inlet of the evaporator 12 to a relatively low pressure gas at an outlet of the evaporator 12. The outlet of the evaporator 12 is connected to an inlet of a compressor 14.

The compressor 14 may be conventional in the art and is configured to compress the low pressure gas refrigerant from the evaporator 12 and move the refrigerant through the refrigeration system 10.

Relatively high pressure gas is discharged from an outlet of the compressor 14 to an inlet of a condenser 16. The condenser 16 may be conventional in the art and is configured to remove heat from the relatively high pressure gas as it passes therethrough. As a result, the high pressure gas condenses and becomes a relatively high pressure liquid.

The high pressure liquid then moves from an outlet of the condenser 16 to an expansion device 18, such as a capillary tube. Other expansion devices, such as for example a fixed orifice, may be used in the refrigeration system 10 in lieu of a capillary tube. The expansion device 18 is configured to restrict the flow of fluid therethrough and, as a result, the fluid pressure is lowered as the fluid leaves the expansion device 18. The relatively low pressure fluid is then returned to the inlet of the evaporator 12, and the refrigeration cycle is repeated. The refrigeration system 10 may also include a variety of other well known components to facilitate and optimize the process.

Figure 2:
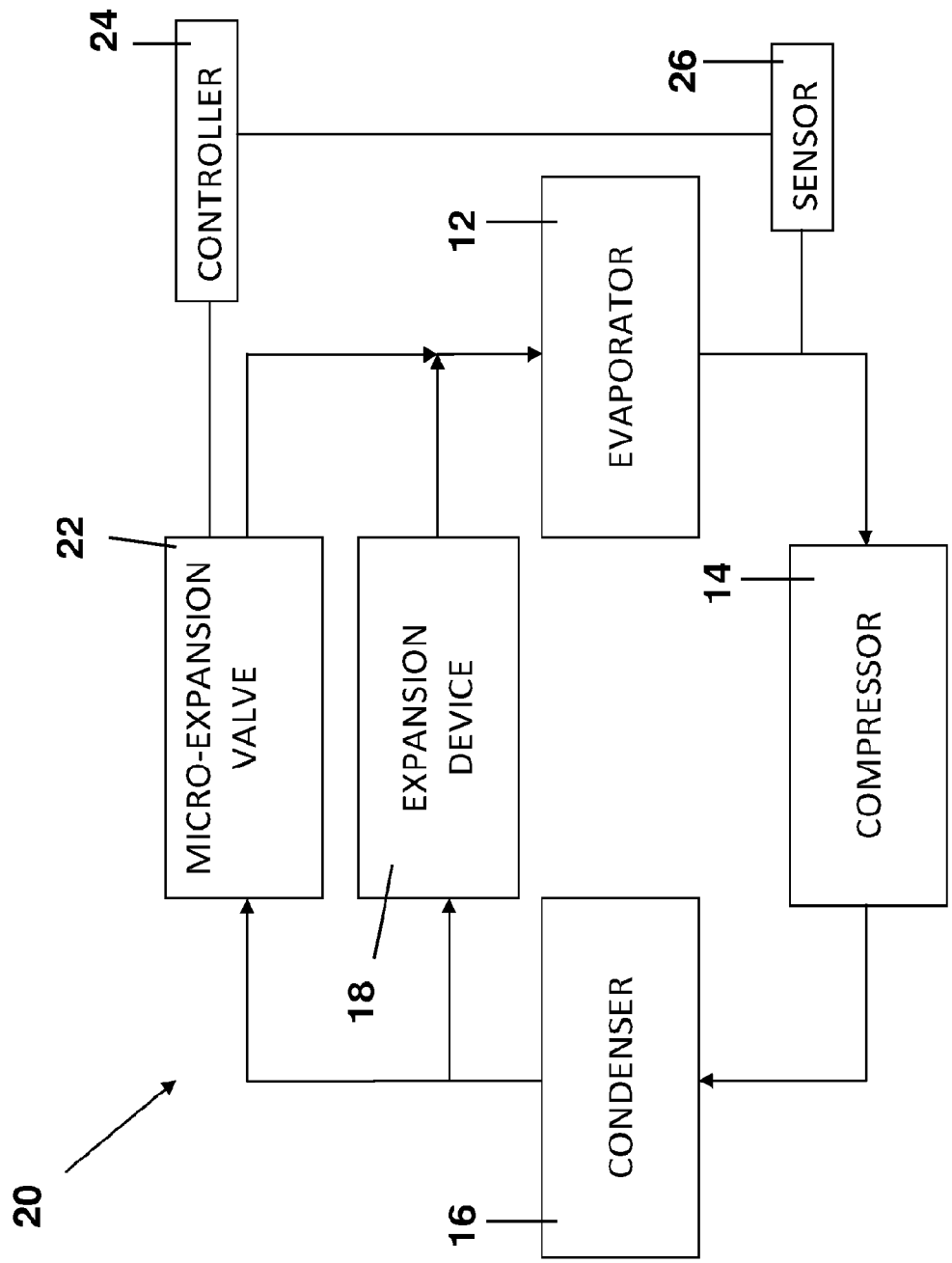
FIG. 2 is a block diagram of a first embodiment of an improved structure for a refrigeration system in accordance with this invention.

FIG. 2 is a block diagram of a first embodiment, indicated generally at 20, of an improved structure for a refrigeration system in accordance with this invention. The improved refrigeration system 20 includes the evaporator 12, the compressor 14, the condenser 16, and the expansion device 18. A micro-expansion device, configured as micro-expansion valve 22, described below, is connected in parallel with the expansion device 18. A control mechanism, such as a superheat sensor/controller 24 may be fluidly connected to a fluid or suction line that connects the evaporator 12 and the compressor 14. An external sensor 26 is also attached to the suction line. An electrical signal transmission line (not shown) connects the external sensor 26, the superheat controller 24 and the micro-expansion valve 22. U.S. patent application Ser. No. 13/563,017 to Arunasalam et al. and filed Jul. 31, 2012, the disclosure of which is incorporated herein in its entirety by reference, describes superheat sensors, controllers, and processors, and their operation. The external sensor 26 may be any desired sensor, such as for example, a temperature sensor, a pressure sensor, or a combination temperature and pressure sensor.

Figure 3:
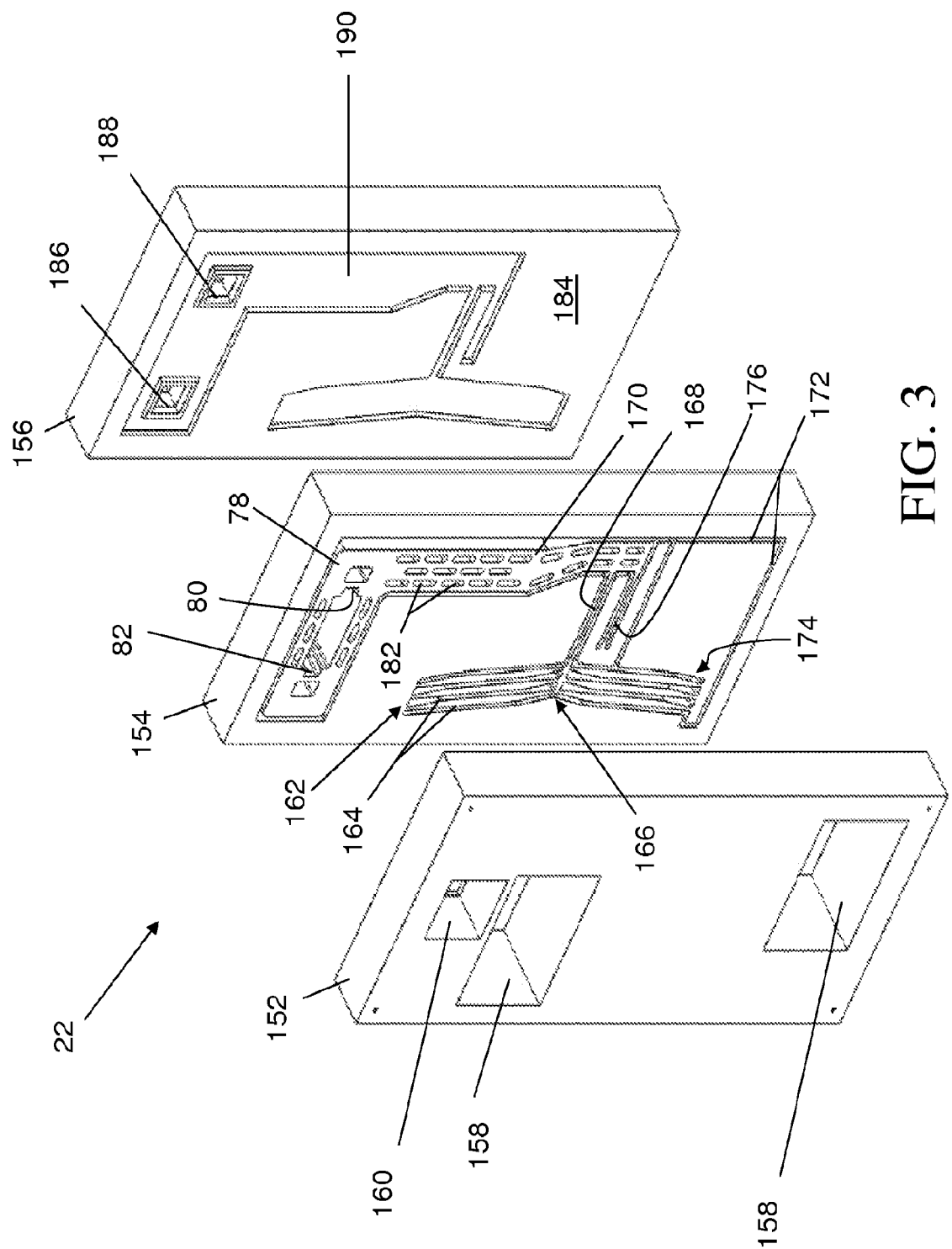
FIG. 3 is a perspective view of a microvalve that can be used in the first embodiment of the refrigeration system illustrated in FIG. 2.

FIG. 3 is a perspective view of the micro-expansion valve 22 used in the first embodiment of the refrigeration system illustrated in FIG. 2. The illustrated micro-expansion valve 22 includes a cover plate 152, an intermediate plate 154, and a base plate 156.

The cover plate 152 includes electrical ports 158 for passing respective electrical wires therethrough for connection to respective bond pads (not shown) formed on spaced apart portions of the intermediate plate 154, thereby permitting an electric current to pass therebetween upon connection to, and application of, electrical power from a source of electrical power (not shown). The cover plate 152 also includes a common fluid port 160.

The intermediate plate 154 includes an actuator 162 having a plurality of actuator ribs 164 formed in herringbone pattern. A central rib region 166 of the ribs 164 is joined to a moveable central spine 168, and a displaceable actuator arm 170 is operatively coupled to the spine 168. The intermediate plate 154 may also include one or more air flow passages 172 for purging air from an open end rib region 174 of the ribs 164 and out of the micro-expansion valve 22.

The actuator arm 170 includes a pivot anchor or hinge 176 that bends or flexes to accommodate arcuate movement of the actuator arm 170 in a plane that is substantially parallel to the cover plate 152, the intermediate plate 154, and the base plate 156. The actuator arm 170 also includes a valve element 78 having slots 80 and 82 for controlling the flow of fluid through the micro-expansion valve 22 and a plurality of pressure equalization openings 182 for reducing or preventing pressure imbalances of the valve element 78 that would otherwise tend to cause movement of the actuator arm 170 out of the plane of normal arcuate motion during actuation and un-actuation thereof.

As used in the description of the invention and the appended claims, the terms "un-actuated" and "un-actuation" are defined as a steady-state condition of the microvalve device prior to application of electrical power to; i.e., prior to the actuation of the microvalve device actuator.

An inner surface 184 of the base plate 156 includes a plurality of fluid ports for permitting passage of fluid through the micro-expansion valve 22, including a normally open fluid port 186, and a normally closed fluid port 188. The inner surface 184 of the base plate 156 also includes an actuator cavity 190.

During actuation of the microvalve device 150, the ribs 164 are heated by passing an electrical current therethrough. The ribs 164 then undergo thermal expansion and elongate, which urges the spine 168 and the attached actuator arm 170 away from the ribs 164 (to the right when viewing FIG. 3). The actuator arm 170 then bends or flexes at the hinge 176 to accommodate movement of the spine 168 thereby causing the valve element 78, and its slots 80 and 82 to move in the plane of normal motion along an arcuate path (to the right when viewing FIG. 3) to a stressed position, which closes the normally open fluid port 186 and opens the normally closed fluid port 188.

When the electrical current is removed from the ribs 164, the ribs 164 cool and contract, urging the central spine 168 back toward the ribs 164 (to the left when viewing FIG. 3). The actuator arm 170 and valve element 23 then return to an un-actuated position, such as shown in FIG. 3, wherein the normally open fluid port 186 is again open, and normally closed fluid port 188 is again closed.

Figure 4:
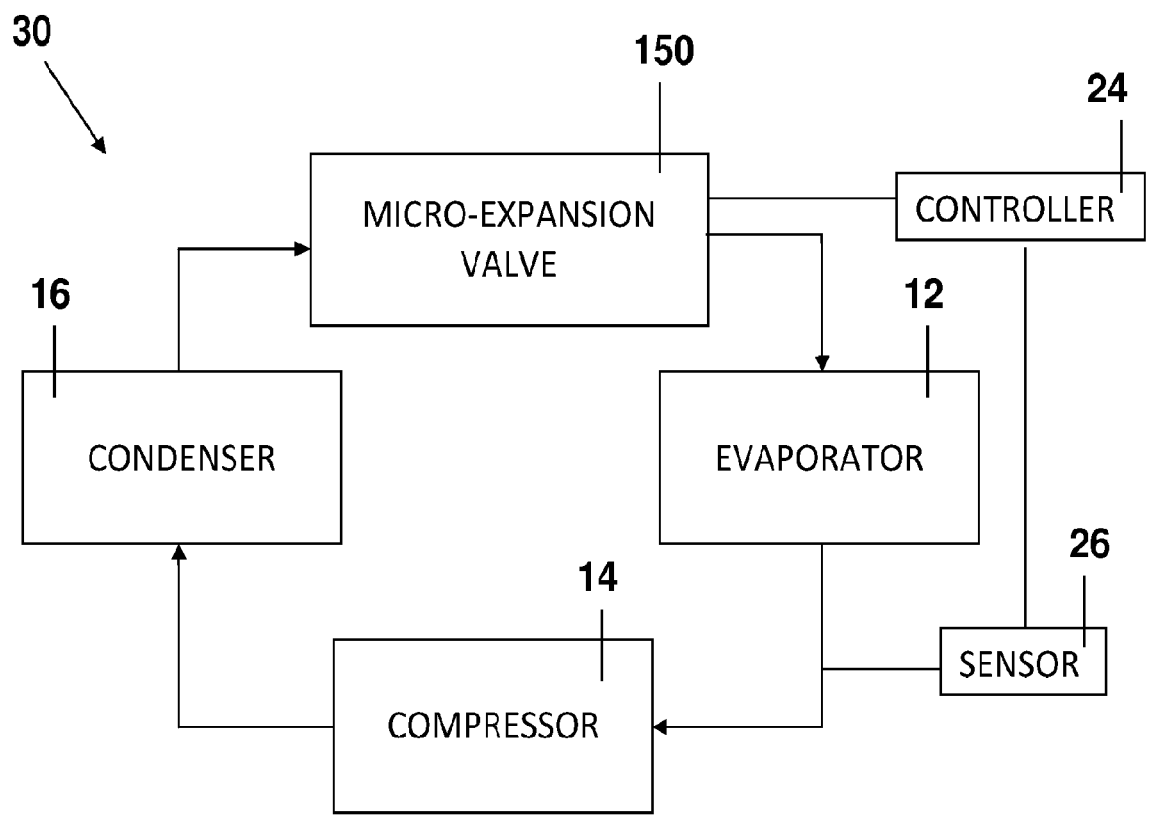
FIG. 4 is a block diagram of a second embodiment of an improved structure for a refrigeration system in accordance with this invention.

FIG. 4 is a block diagram of a second embodiment, indicated generally at 30, of an improved structure for a refrigeration system in accordance with this invention. The improved refrigeration system 30 includes the evaporator 12, the compressor 14, the condenser 16, the expansion device 18, the superheat controller 24, and the external sensor 26. In lieu of the expansion device 18 and micro-expansion valve 22 provided in the improved refrigeration system 20, the improved refrigeration system 30 includes a micro-expansion valve 150, described below, connected between the condenser 16 and the evaporator 12.

Figure 5:
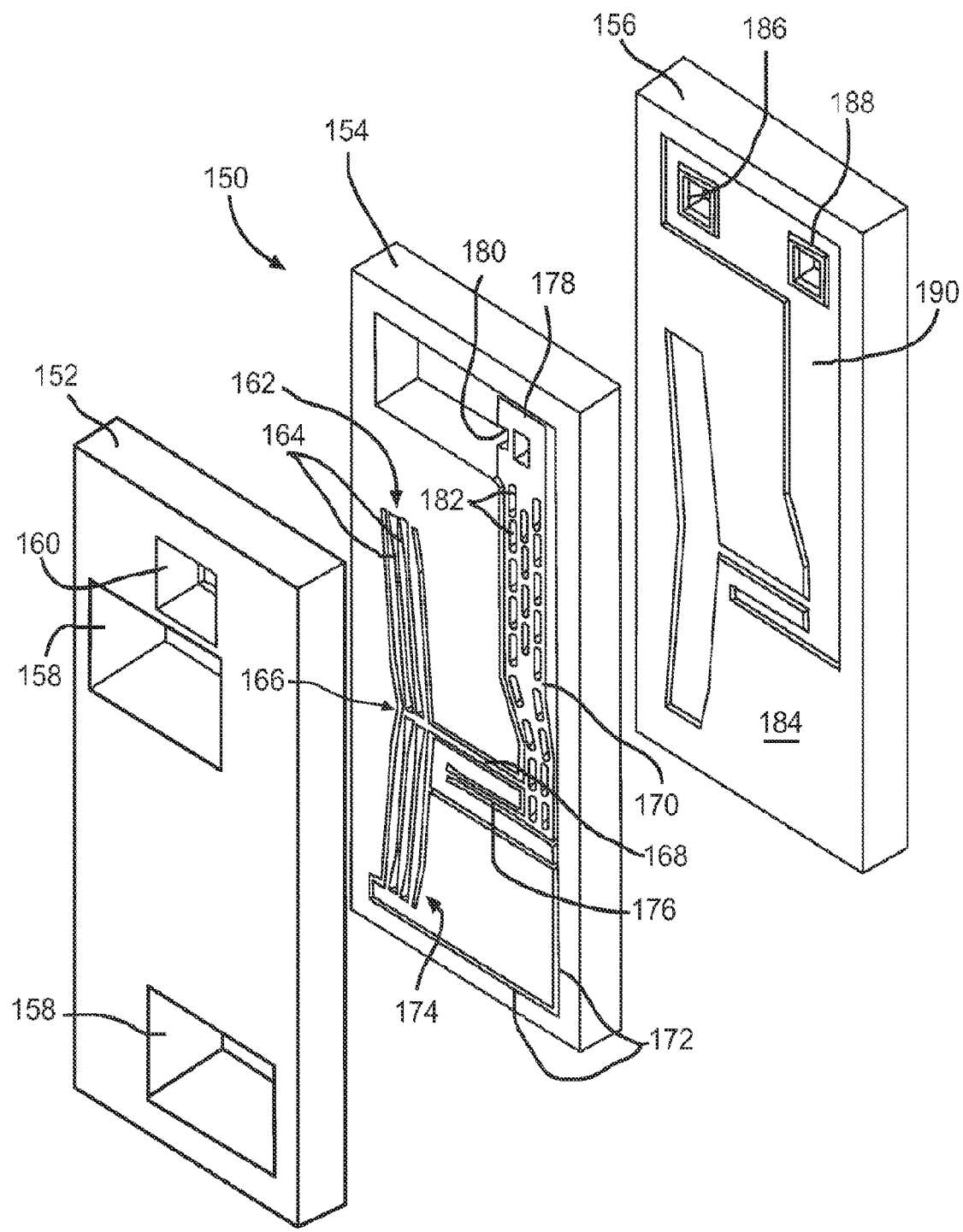
FIG. 5 is a perspective view of a microvalve that can be used in the second embodiment of the refrigeration system illustrated in FIG. 4.

FIG. 5 is a perspective view of the micro-expansion valve 150 used in the second embodiment of the refrigeration system 30 illustrated in FIG. 4. The micro-expansion valve 150 is similar to the micro-expansion valve 22, and the same reference numerals will be used to identify features common to both refrigeration systems.

In lieu of the valve element 78, the micro-expansion valve 150 includes a valve element 178 formed at a distal end of the actuator arm 170. The valve element 178 includes a slot 80 for controlling the flow of fluid the normally closed fluid port 188. The valve element 178 is also shorter than the valve element 78 and does not cover the normally open fluid port 186.

The micro-expansion valve 150 is configured to operate as the expansion device in the refrigeration system 30, wherein the normally open fluid port 186 functions as a fixed orifice providing a fixed flow path and the normally closed fluid port 188 is configured to operate as a variable flow path in parallel to the fixed flow path when an increase in cooling demand beyond the steady state operating load is detected by the superheat controller 24. Like the expansion device 18, the normally open fluid port 186 always permits a minimum amount of fluid to flow from the common port 160 through the normally open port 186 and through the refrigeration system 30. The normally open fluid port 186 may have any desired size, which will be determined by the anticipated normal operating conditions of the refrigeration system 30. In a steady state, no fluid flows through the normally closed fluid port 188. When an increased load demand condition occurs, the normally closed fluid port 188 may be opened to meet the increased load to allow flow from the common port 160 through the normally closed fluid port 188. Alternatively, the fluid port 188 of the micro-expansion valve 150 may be configured to operate in a modulating mode, wherein the fluid flow can be either (1) zero, i.e., an off mode, (2) a maximum value, i.e., a continuously on mode, or (3) a fluid flow rate greater than zero but less than the flow rate in the continuously on mode. Accordingly, the amount of fluid flowing from the condenser 16 to the evaporator 12 may be adjusted in accordance with varying operating conditions of the refrigeration system 30, including normal operating conditions and when experiencing an increased transient load.

Figure 6:
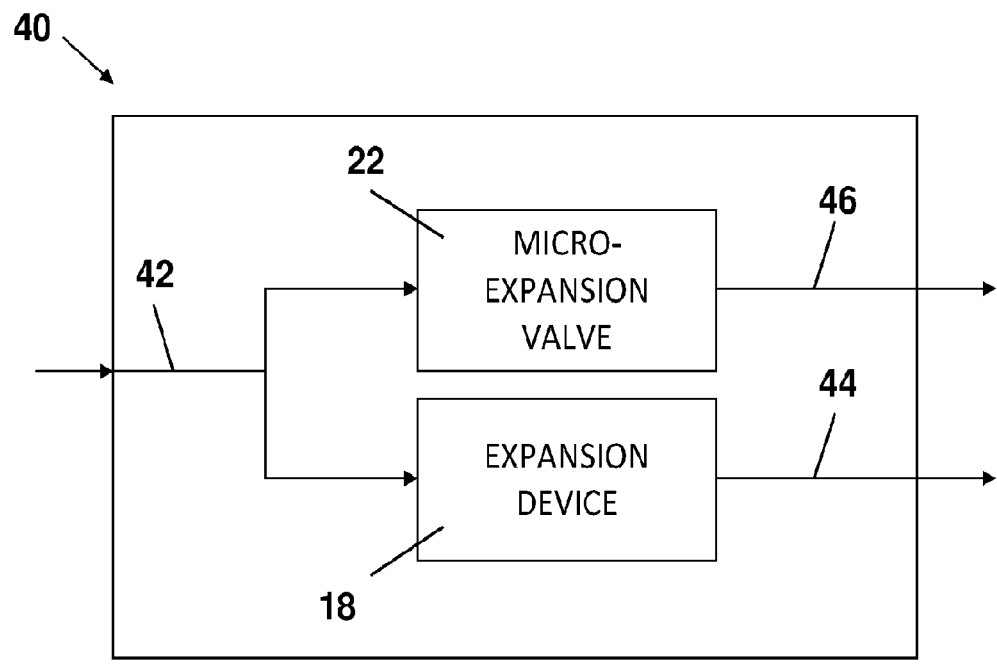
FIG. 6 is a block diagram of a third embodiment of an improved structure for a refrigeration system in accordance with this invention.

FIG. 6 is a block diagram of a portion of a third embodiment, indicated generally at 40, of an improved structure for a refrigeration system in accordance with this invention. The improved refrigeration system 40 is similar to the improved refrigeration system 20, but the expansion device 18 and the micro-expansion valve 22 are connected via a single fluid inlet 42 to the condenser (not shown). In the refrigeration system 40, the expansion device 18 is connected to the evaporator (not shown) via a first fluid outlet 44, and the micro-expansion valve 22 is connected to the evaporator (not shown) via a second fluid outlet 46. The operation of the expansion device 18 and the micro-expansion valve 22 are as described above in the description of the improved refrigeration system 20.

Figure 7:
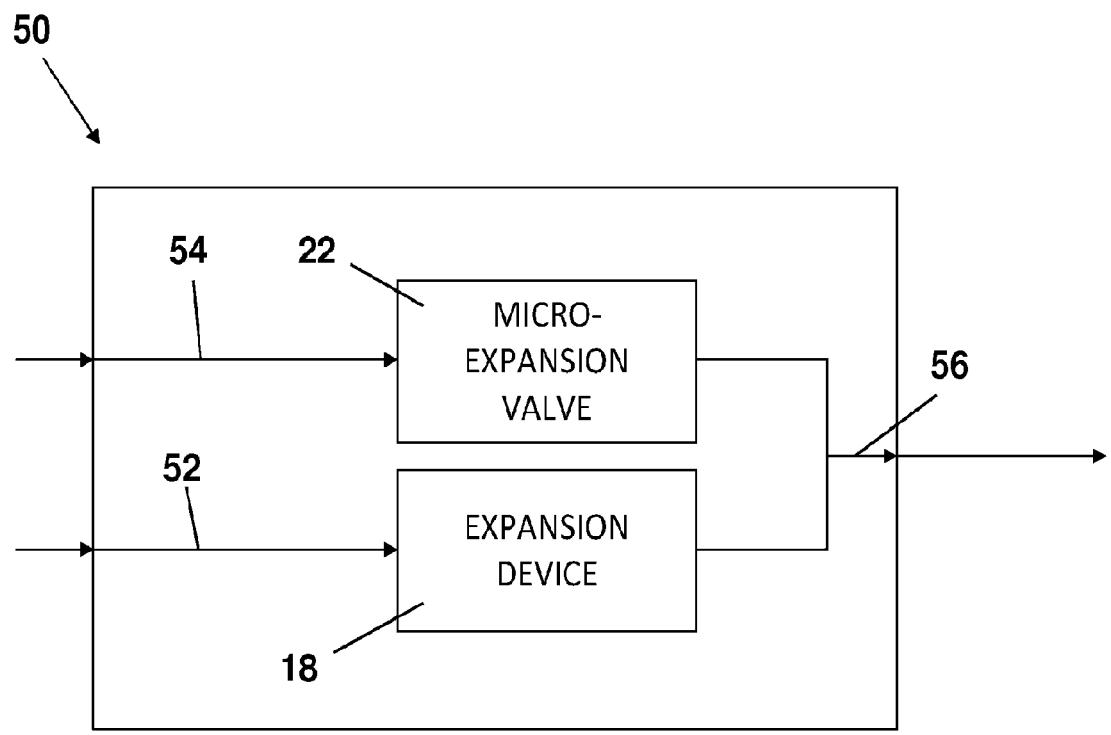
FIG. 7 is a block diagram of a fourth embodiment of an improved structure for a refrigeration system in accordance with this invention.

FIG. 7 is a block diagram of a portion of a fourth embodiment, indicated generally at 50, of an improved structure for a refrigeration system in accordance with this invention. The improved refrigeration system 50 is similar to the improved refrigeration system 20. In the improved refrigeration system 50 however, the expansion device 18 is connected via a first fluid inlet 52 to the condenser (not shown) and the micro-expansion valve 22 is connected via a second fluid inlet 54 to the condenser (not shown). The expansion device 18 and the micro-expansion valve 22 are connected to the evaporator (not shown) via a single fluid outlet 56. The operation of the expansion device 18 and the micro-expansion valve 22 are as described above in the description of the improved refrigeration system 20.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A refrigeration system comprising:
   a compressor;
   a condenser fluidly connected to the compressor;
   an evaporator fluidly connected to the condenser and the compressor, such that fluid may flow from the compressor through the condenser, through the evaporator, and again through the compressor;
   a fixed expansion device fluidly connected between the condenser and the evaporator; and
   a micro-expansion valve fluidly connected between the condenser and the evaporator;
   wherein the micro-expansion valve is connected between the condenser and the evaporator in parallel with the fixed expansion device; and
   wherein the fixed expansion device and the micro-expansion valve are connected to an inlet of the evaporator via a single fluid outlet, the single fluid outlet defining a single fluid flow path from the fixed expansion device and the micro-expansion valve upstream of the evaporator.

2. The refrigeration system according to claim 1, wherein the fixed expansion device and the micro-expansion valve are connected to the condenser via a single fluid inlet.

3. The refrigeration system according to claim 1, wherein the fixed expansion device is configured to provide a fixed rate of fluid flow therethrough.

4. The refrigeration system according to claim 1, wherein the fixed expansion device is a fixed orifice.

5. The refrigeration system according to claim 1, wherein the fixed expansion device is a capillary tube.

6. The refrigeration system according to claim 1, wherein the micro-expansion valve is configured to be selectively opened and closed in response to an increased transient cooling load so as to provide a variable rate of fluid flow therethrough.

7. The refrigeration system according to claim 1, further including a superheat controller fluidly connected between the evaporator and the compressor.

8. The refrigeration system according to claim 1, wherein the superheat controller includes one of a temperature sensor, a pressure sensor, and a combination temperature/pressure sensor.

9. The refrigeration system according to claim 1, wherein the superheat controller is configured to sense a condition of refrigerant gas moving between the evaporator and the compressor.

10. A refrigeration system comprising:
a compressor;
a condenser fluidly connected to the compressor;
an evaporator fluidly connected to the condenser and the compressor, such that fluid may flow from the compressor through the condenser, through the evaporator, and again through the compressor; and
a micro-expansion valve fluidly connected between the condenser and the evaporator;
wherein the micro-expansion valve includes a normally open first valve port defining a fixed expansion device and a second valve port configured to provide a variable rate of fluid flow therethrough; and
wherein the micro-expansion valve is connected to an inlet of the evaporator via a single fluid outlet, the single fluid outlet defining a single fluid flow path from the first and second valve ports upstream of the evaporator.

11. The refrigeration system according to claim 10, wherein the normally open first valve port is configured to provide a fixed rate of fluid flow therethrough.

12. The refrigeration system according to claim 10, wherein the second valve port is configured to be selectively opened and closed in response to an increased transient cooling load.

13. The refrigeration system according to claim 10, further including a superheat controller fluidly connected between the evaporator and the compressor.

14. The refrigeration system according to claim 13, wherein the superheat controller includes one of a temperature sensor, a pressure sensor, and a combination temperature/pressure sensor.

15. The refrigeration system according to claim 13, wherein the superheat controller is configured to sense a condition of refrigerant gas moving between the evaporator and the compressor.

* * * * *